United States Patent
Bell et al.

(10) Patent No.: US 7,240,186 B2
(45) Date of Patent: Jul. 3, 2007

(54) SYSTEM AND METHOD TO AVOID RESOURCE CONTENTION IN THE PRESENCE OF EXCEPTIONS

(75) Inventors: Shane L. Bell, Shrewsbury, MA (US); Matthew C. Mattina, Hudson, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 639 days.

(21) Appl. No.: 09/906,345

(22) Filed: Jul. 16, 2001

(65) Prior Publication Data

US 2003/0014221 A1 Jan. 16, 2003

(51) Int. Cl.
*G06F 9/44* (2006.01)
(52) U.S. Cl. .................... 712/244; 712/214
(58) Field of Classification Search ............... 712/217, 712/244
See application file for complete search history.

(56) References Cited

U.S. PATENT DOCUMENTS

| | | | | |
|---|---|---|---|---|
| 5,404,469 A | * | 4/1995 | Chung et al. ............... | 712/215 |
| 5,469,552 A | * | 11/1995 | Suzuki et al. .............. | 712/244 |
| 5,627,981 A | * | 5/1997 | Adler et al. ................ | 712/235 |
| 5,634,023 A | * | 5/1997 | Adler et al. ................ | 712/244 |
| 5,673,426 A | * | 9/1997 | Shen et al. ................. | 712/244 |
| 5,740,391 A | * | 4/1998 | Hunt ......................... | 712/200 |
| 5,778,219 A | * | 7/1998 | Amerson et al. ........... | 712/244 |
| 5,799,179 A | * | 8/1998 | Ebcioglu et al. ............ | 712/234 |
| 5,867,725 A | * | 2/1999 | Fung et al. .................. | 712/23 |
| 5,915,117 A | * | 6/1999 | Ross et al. .................. | 710/262 |
| 5,987,600 A | * | 11/1999 | Papworth et al. ........... | 712/244 |
| 6,651,163 B1 | * | 11/2003 | Kranich et al. ............. | 712/244 |
| 2002/0194467 A1 | * | 12/2002 | Reilly et al. ................ | 712/244 |

* cited by examiner

*Primary Examiner*—Eddie Chan
*Assistant Examiner*—Aimee J. Li (57) ABSTRACT

A multi-threaded processor is configured to detect excepted instructions from a first program, and to stop fetching younger instructions from that same program, to thereby conserve system resources that can be used by other programs. Each fetched program instruction has an associated status bit, which is set if the instruction excepts. Each excepting instruction is logged in an exception logging unit, which causes the associated status bit to be set. Each program has an associated in-flight vector table that tracks the instructions that have been fetched for that program. The status bits are compared with the in-flight vector table to identify the program that is associated with an excepted instruction. That program is then disabled, thereby preventing further fetching of instructions for that program until the excepted instruction clears.

21 Claims, 2 Drawing Sheets

FIG. 1

SYSTEM AND METHOD TO AVOID RESOURCE CONTENTION IN THE PRESENCE OF EXCEPTIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to the interpretation and execution of software instructions by a processor in a computer system. More particularly, the present invention relates to the handling of program instructions for which an exception has occurred. Still more particularly, the present invention relates to an exception handler for a processor that operates more efficiently by disabling fetching for programs that have excepted instructions that have not been resolved.

2. Background of the Invention

A computer system includes a number of components with specialized functions that cooperatively interact to produce the many effects available in modem computer systems. The ability of these various components to exchange data and other signals is vital to the successful operation of a computer system. Typically, components interact by reading or writing data or instructions to other components in the system.

Computer systems typically include a processor (or CPU), random access memory (RAM), and certain peripheral devices such as a floppy drive, a keyboard and a display. These components typically couple together using a network of address, data and control lines, commonly referred to as a "bus." As computer technology evolved, it became common to connect additional peripheral devices to the computer through ports (such as a parallel port or a serial port), or by including the peripheral device on the main system circuit board (or "motherboard") and connecting it to the system bus.

The computer operates by having data flow through the system, with modification of the data occurring frequently. Traditionally, the CPU controls most activities in the computer system. The CPU supervises data flow and is responsible for most of the high-level data modification in the computer. In addition, the CPU receives signals from the peripheral devices, reads and writes data to memory, processes data, and generates signals controlling the peripheral devices. The CPU is often referred to as the "brain" of the computer system.

The CPU is a device that operates according to instructions programmed by a designer or programmer. Thus, every operation that the CPU performs is based on one or more programmed instruction. In normal operation, the CPU performs many operations on an instruction, three of which are: (1) it fetches the instruction; (2) it decodes the instruction; and (3) it executes the instruction. In a single "pipeline" CPU architecture, each of these different operations is performed sequentially. To improve CPU performance, modem processor architectures often include a plurality of instruction pipelines to enable the CPU to perform operations on multiple instructions in parallel. To further improve CPU performance, pipelined processors often attempt to predict which instructions should be fetched, decoded and perhaps even executed, even before it is certain that the instruction forms part of the program flow. These predictions typically are performed pursuant to parameters programmed in a prediction algorithm that attempt to determine which branch the program will follow. Thus, in modem CPU designs, the CPU may operate on multiple instructions in different pipelines, and may begin operating on instructions that ultimately are not part of the program.

During normal CPU operation, any error in fetching, decoding, executing or otherwise processing an instruction is referred to as an "exception." Put simply, an excepted instruction is an instruction that cannot be properly executed by the processor. Thus, for example, if an instruction cannot be accurately decoded, or if an instruction code is not recognized, that is an exception event. Another type of exception occurs when the CPU performs an erroneous prediction of the instruction flow. Thus, if the program branches differently than that predicted by the prediction algorithm, then instructions may be fetched and decoded which are unnecessary to proper CPU operation. The initial divergence from the program flow is typically referred to as an exception.

As processors become faster, they are designed to execute more instructions in parallel. Every instruction has the possibility to except, and thus, as the CPU operates on more instructions, the greater the number of exceptions that will arise. In addition, exceptions can be detected at various stages of the pipeline. As the pipeline becomes longer and wider, more stages or ports are created from which exceptions may be issued. As a further consequence of handling a multiplicity of instructions in parallel, the processor must look further ahead the program flow to fetch and decode instructions that may be needed. The further the CPU must predict ahead, the greater the likelihood that a misprediction will occur, and the more instructions that must be flushed when a misprediction is discovered. It is generally desirable for a CPU to recognize an exception as early as possible, and where necessary, to take corrective steps to handle the exception.

Typically, the exception handler is designed to select the oldest exception to analyze and correct. The oldest exception is the earliest instruction in the program flow. Thus, assume a program is executing with instruction A, B, C, D E and F in sequence. Because most conventional processors fetch instructions in-order, the CPU may fetch instruction B at time t, and may fetch instruction F at time t+4. Because of the out-of-order nature of certain processors, the CPU may actually execute instructions B and F at the same time, although they were brought into the CPU at different times. If instructions B and F both were found to have an exception, the CPU would treat the exception created by instruction B as older than the exception created by instruction F. Because instruction B happened earlier in the program flow, the exception handler would first analyze instruction B for problems.

One problem with existing exception handlers is that they may "handle" bad path instructions. Bad path instructions are instructions that lie in an errant path. Thus, in the example above, if instruction B is a branch misprediction instruction, this is the excepting instruction that starts a bad path. Any subsequent instruction fetched in response to the excepting instruction lies in an errant path. Time and resources devoted to processing instructions in an errant path are wasted, because none of these instructions will be relevant to processing the program once the exception is resolved. This inefficiency also means that the processing of other good instructions was delayed while the errant path instructions were processed.

It would be advantageous if a new architecture and method was created to minimize processing on instructions in errant paths, thereby permitting processor resources to operate more efficiently on good instructions. Despite the apparent advantages, to date no one has developed an exception handler for a processor that effectively minimizes the processing of bad path instructions.

BRIEF SUMMARY OF THE INVENTION

The present invention solves the deficiencies of the prior art by stopping all bad path operations on a program once an exception is detected in that program, thereby permitting instructions from other programs to be processed while the exception is resolved. Once the exception is resolved, processing of the program resumes and all instructions in the errant path are eliminated.

According to the preferred embodiment, the present invention classifies excepted instructions into different categories, to thereby permit performance critical exceptions to be handled more expeditiously. In particular, the present invention includes two or more exception handlers in the processor circuitry. One exception handler preferably receives performance critical exceptions, while the other exception handler receives non-performance critical exceptions. The performance critical exceptions may include, for example, branch mispredictions, while the non-performance critical exceptions may comprise instructions that cannot be decoded, or instructions which would produce a system error (such as a divide by zero operation). The different categories of exceptions are handled separately in two different exception handlers. Exceptions that are performance critical are handled speculatively to permit quicker resolution of these exceptions so as not to delay the program execution. Thus, performance critical exceptions are resolved even though it is not certain that these exceptions lie in the actual program path. Conversely, non-performance critical exceptions are handled non-speculatively, so that the exception is resolved only when it is known to lie in the actual program path.

With respect to non-speculative exceptions, the present invention handles these exceptions in a manner designed to conserve system resources, and thereby provide increased processor performance. In particular, when a non-speculative exception is detected, the processor stops fetching younger instructions from the same program based on the fact that any subsequent instructions from that program are bad path instructions that will be flushed from the pipeline. Thus, if an excepted instruction is detected, only instructions that are older (i.e., earlier in the program flow) than the excepted instruction will be fetched by the processor until the excepted instruction is resolved. This frees processor resources to execute good threads from other programs while the excepted instruction is resolved.

These and other aspects of the present invention will become apparent upon analyzing the drawings, detailed description and claims, which follow.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, processor and computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. The term "CPU", "processor", and "microprocessor" are used synonymously to broadly refer to the device in a computer system that interprets and executes programmed instructions. The term "exception" or "excepted instruction" refers to an event or instruction that causes suspension of normal program execution. The term "thread" refers to a program, or section of a program, that may be executing on a processor. Consequently, in the following description, the terms "thread" and "program" are used synonymously. The term "multi-threaded processor" refers to a processor that is capable of performing operations on instructions from two or more programs concurrently. To the extent that any term is not specially defined in this specification, the intent is that the term is to be given its plain and ordinary meaning.

DETAILED DESCRIPTION OF THE PREFERRED EMBODIMENTS

Figure 1:
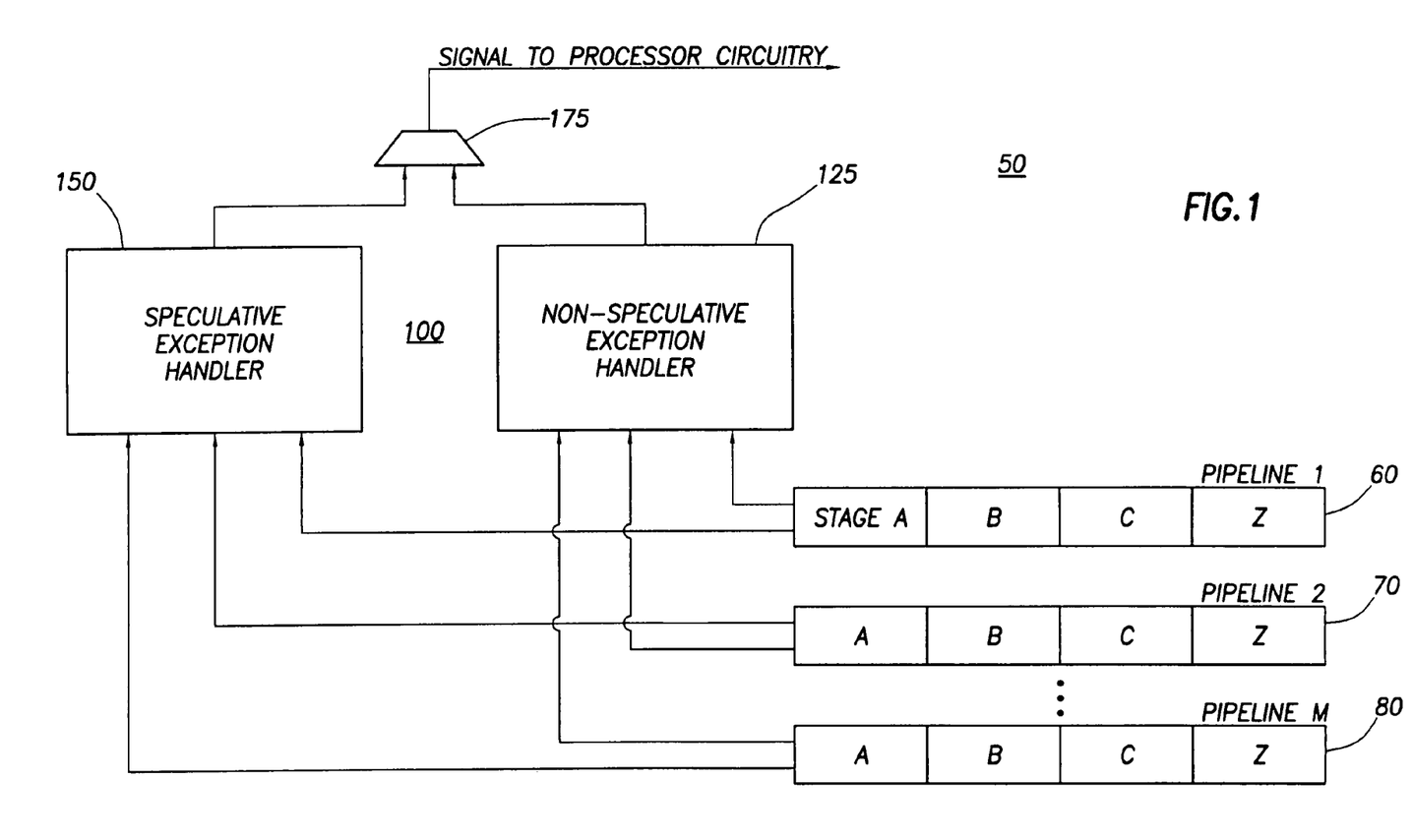
FIG. 1 is a partial illustration of a processor constructed in accordance with the preferred embodiment with two exception handlers.

Referring now to FIG. 1, the present invention constructed in accordance with the preferred embodiment comprises a processor 50 with a plurality of pipelines 60, 70, 80 for fetching, decoding and executing program instructions. The width of the pipeline may be any arbitrary size. A processor may support any arbitrary number of threads, as denoted by the indication that m threads may be implemented. Each pipeline also has a plurality of stages at which different operations may occur, including for example, fetching, decoding and executing program instructions. Other stages may also be provided as desired in the pipeline, without limitation. Each of the pipelines have been shown, for purposes of illustration, as including stages a, b, c . . . z, with the understanding that the number of pipeline stages is not material to the teachings of the present invention.

According to the preferred embodiment, the processor 50 includes an exception handling section 100 that receives excepted instructions from one or more stages of the pipelines. In accordance with the preferred embodiment, and as shown in FIG. 1, the exception handling section 100 comprises a speculative exception handler 150 and a non-speculative exception handler 125. The exception handlers 125, 150 may be configured as a single unit, or can be configured separately, as desired by the designer.

The speculative exception handler 150 preferably handles performance critical exceptions that need to be resolved in an expeditious manner to resume the actual program path as early as possible. An example of a performance critical exception in the preferred embodiment is branch mispredictions. Mispredictions occur on a relatively frequent basis, and it is generally desirable from a performance perspective to handle such exceptions on an expedited basis. A process operation cannot be completed until an exception arising from a branch misprediction is resolved. Thus, branch mispredictions potentially delay completion of a program. Other examples of performance critical exceptions (in addition to branch mispredictions) according to the preferred embodiment include load/store order traps and jump mispredictions. A load/store order trap occurs when a store instruction precedes a load address instruction in the process flow, but the load address instruction executes earlier than the store instruction. Thus, if these instructions execute out-of-order, the wrong value may be loaded. A load/store order trap preferably is recognized by one or more algorithms in the processor, and the speculative exception handler 150 then causes the load operation to be re-executed so that the proper load value is loaded in the desired register.

The exception handler 150 is referenced as a speculative handler in FIG. 1, denoting that exceptions may be taken out of order, if doing so would improve performance. Thus, speculative exception handler 150 may begin processing an exception as soon as it arrives, even though prior instructions have not yet executed. Preferably, the exceptions routed to the speculative exception handler 150 are sufficiently critical to the performance of the processor 50 that the speculative exception handler 150 does not wait to confirm that the exception lies in the path of the executing program. Thus, the speculative exception handler 150 will resolve excepted instructions even though it is not clear that the exception lies in the actual proper path of the program flow. According to the preferred embodiment, the risk that time and resources may be wasted in resolving such speculative instructions is out-weighed by the performance gain that results from expeditious resolution of these critical instructions.

In accordance with the preferred embodiment, the speculative exception handler 150 preferably receives performance critical exceptions from each stage of the various pipelines, although this is not a requirement of the present invention. The exceptions may be detected and flagged as critical by any suitable techniques or algorithms running on the processor. Typically, the processor includes hardware that detects each possible type of exception. Thus, if the decoding engine is unable to decipher an instruction code, an invalid instruction detection algorithm will cause the instruction to be flagged and routed to the non-performance critical handler 125. Similarly, if a branch misprediction algorithm detects an actual program branch path that differs from the predicted path, it flags the mispredicted branch instruction and causes it to be routed it to the speculative exception handler 150. As another example, a load/store trap detector algorithm may scan each load instruction to ensure that a load/store trap has not occurred. If a load/store trap is detected, the excepted load instruction is routed to the speculative exception handler 150 with an indication that a load/store trap has occurred with this instruction. As one or more exceptions arrive at the speculative exception handler 150, the speculative exception handler 150 selects one of the excepted instructions to be resolved (which in the preferred embodiment is the oldest excepted instruction), even though the instruction may still be speculative in the sense that the processor does not yet know for sure that this instruction will need to execute. If the excepted instruction is a branch misprediction, the processor preferably will resolve the exception by initiating the fetching and decoding of the correct branch destination instruction, so that the program can be completed without excessive delay.

The non-speculative exception handler 125 preferably handles non-performance critical exceptions that are detected in one or more of the pipeline stages. Typically, the non-performance critical exceptions are those exceptions that are detected as invalid or illegal instructions. This includes instructions that cannot be decoded, and instructions which, when executed, violates a rule of operation (such as divide by zero). Other non-performance critical excepted instructions include arithmetic overflows and cache parity errors. These sorts of non-performance critical exceptions arise on a relatively infrequent basis. Because these excepted instructions are not performance critical, the non-speculative exception handler 125 does not initiate resolution of these exceptions until it is clear that they reside in the actual program path. Thus, the non-speculative exception handler 125 preferably delays resolution of the non-performance critical exceptions until it is clear that the instruction need to be executed to complete the program. If the non-performance critical exception is discovered to be down a bad path such as from the result of a mispredicted branch, the exception is flushed without being selected by the non-speculative exception handler 125. Stated differently, the non-speculative exception handler 125 only selects exceptions for resolution that are definitely in the actual program path.

The present invention seeks to classify every possible exception into performance critical exceptions that need to be handled quickly for performance purposes, or non-performance critical exceptions that can be resolved on a less expeditious basis without significantly impacting performance. Except as specifically stated in the appended claims, the present invention is not intended to be limited to any particular classification of exceptions. Thus, the decision of which exceptions are classified in each category is arbitrary, and is left to the discretion of the system designer or architect. The net result, preferably, is that non-speculative exception handler 125 can be figured as a relatively large, but slower handler, while speculative exception handler 150 is configured as a smaller, faster handler to effectuate exception handling that enhances processor performance without a large associated cost.

In the event that multiple excepted instructions are pending, the non-speculative and speculative exception handlers 125, 150 may select the exception to resolve based on a variety of different criteria, and the criteria used between the different exception handlers may differ. Preferably, however, if multiple excepted instructions are present in either handler, the handler selects the pending instruction queued in that handler which represents the earliest excepted instruction in the program flow. In addition, if an exception arises from an invalid branch, the hardware flushes the excepted instruction and all younger instructions to prevent resources from being wasted and incorrect program operation in handling an exception from an invalid branch.

The exception handlers 125, 150 may be configured in a variety of ways to recognize the existence and type of excepted instruction. For example, each of the exception handlers 125, 150 may include a queue in which excepted instructions can be stored with an appropriate flag or code that indicates the type of exception. When an instruction is selected from the queue, the instruction and flag are transmitted to appropriate logic circuitry to resolve the exception. This circuitry may be integrated with the exception handler logic, or may be separated and located elsewhere in the processor logic. Preferably, on each cycle, the speculative exception handler 150 selects an excepted instruction to resolve. Similarly, the non-speculative exception handler 125 will select an excepted instruction to resolve, if any instruction is pending in that handler that is certain to lie in the actual program path.

According to the preferred embodiment, a multiplexer 175 or other similar circuit or logic combines the potential output from the two handlers 125, 150 onto a single set of wires to minimize the circuitry required to respond to the exception handlers 125, 150. Thus, according to the preferred embodiment, the multiplexer 175 selects one of the selected exceptions from handlers 125, 150 and signals other parts of the processor to indicate that an exception has arisen that is ripe for resolution, or which has been already resolved. As will be apparent to one skilled in the art, a variety of different multiplexing schemes may be used to determine which exceptions to select from the handlers 125, 150. Moreover, it is possible that different multiplexing decisions may be implemented in the same system, based on various operating conditions or parameters. Generally, according to the preferred embodiment, the default condition of the multiplexer 175 is to select the non-critical exceptions selected by non-speculative exception handler 125, if such an exception appears at the output port of the non-speculative exception handler 125. The non-speculative exception is chosen since it is guaranteed to be an exception from the actual program flow. If no excepted instruction is provided at the output port of the non-speculative exception handler 125, the multiplexer 175 selects the excepted instruction appearing at the output port of the speculative exception handler 150. According to one embodiment, the multiplexer 175 may be configured to periodically select the speculative handler 150 even in the event that an exception is pending at the output port of the non-speculative exception handler 125 to ensure that the speculative exception handler 150 does not become starved. As yet another alternative, various other arbitration schemes may be used to determine how the exceptions are selected from the exception handlers 125, 150, with the understanding that one of the primary criteria is that handling of critical exceptions is generally expedited, while non-speculative exceptions are guaranteed to be from the actual program path. As yet another embodiment, the multiplexer 175 may be omitted, and separate lines may extend from each exception handler 125, 150 to the rest of the processor circuitry. In this event, redundant circuitry may be required in the processor circuitry to handle the dual output ports from the exception handling section 100.

As noted above, the exception handlers 125, 150 may function to store and select exceptions as they arrive, with the resolution of the exception occurring in other logic in the processor. Thus, the output of the handlers 125, 150 may transmit the excepted instruction and type of instruction to other logic in the processor 50 that resolves the exception.

The principles described herein may be applied equally to systems with a single exception handler, or to a speculative exception handler, as one skilled in the art will understand. Preferably the processor comprises a multi-threaded pipeline structure in which instructions from multiple programs may be executed simultaneously in the various pipelines. According to the preferred embodiment, after the processor detects a non-speculative excepted instruction from a particular program, the processor stops fetching additional instructions from that program that are younger (i.e., later in the program flow) than the excepted instruction, until such time as the excepted instruction (or some older exception) is resolved. In this manner, the processor pipelines are not cluttered with new bad path instructions that will have to be flushed when the exception is processed, and thus these resources remain available to execute threads from programs that are more likely to be valid. Stated differently, if a first program with one or more exceptions is instructed to stop bringing instructions not on its actual program path into the pipeline, than more processor resources will be available to service a second program.

Thus, assume a program X has the following program flow:

Instruction A
Instruction B
Instruction C
Instruction D
Instruction E
Instruction F
Instruction G
Instruction H
Instruction I If Instruction E is found to be an invalid instruction, which will not decode, the processor detects this exception, records the exception, and posts the exception to the non-speculative exception handler 125 (FIG. 1). According to the preferred embodiment of the present invention, and in conjunction with the process of posting the exception associated with Exception E, the processor stops fetching younger instructions (which in the example would comprise Instructions F, G, H, I, . . . ). Thus, the pipeline and other processor resources will not be consumed with executing these instructions, which are certain to be killed, until such time as the exception is resolved in the non-speculative handler 125. The exception that will be resolved will be the exception associated with Instruction E, or some older exception associated with Instructions A, B, C, or D. If an exception is subsequently discovered with respect to Instruction B, for example, then Instructions C through I, and any exceptions associated with these instructions, will be flushed from the system. Regardless of which exception ultimately is resolved, the processor does not fetch the new instructions for the errant thread subsequent to detecting the exception in that program. Consequently, processor resources are conserved that then can be used by programs other than program X. Thus, with respect to these instructions that are not needed in the execution of the program, the processor saves fetch, decode and execute cycles that would otherwise be wasted on these instructions. At the same time, these saved cycles can be used to service instructions from other co-pending programs. Even in a single threaded system, where only a single program is executing, the implementation of the present invention has the advantage of saving power because cycles with no beneficial impact are eliminated. Even in a single threaded system, it also increases the likelihood of resources being immediately available for the new instructions on the actual program path.

Figure 2:
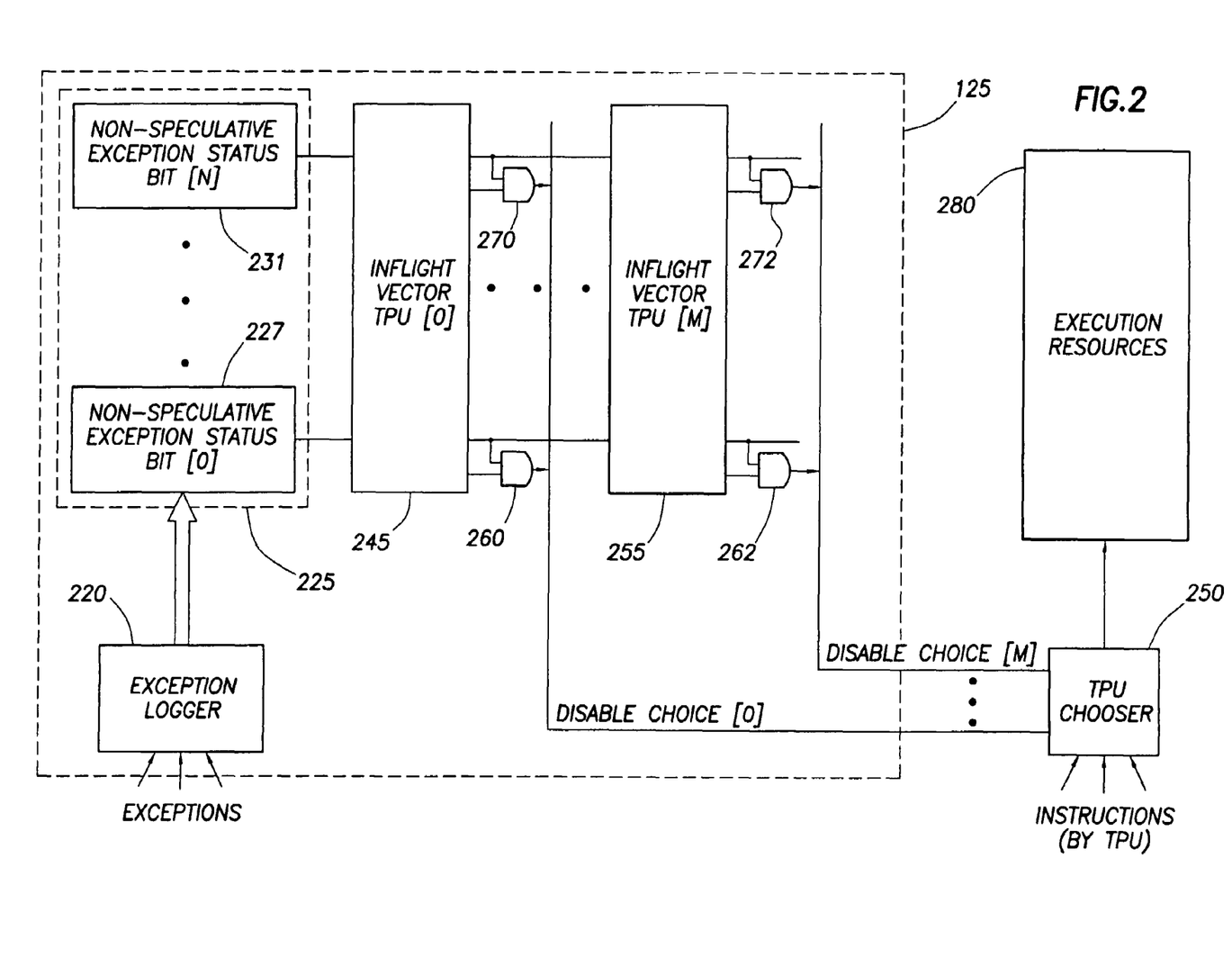
FIG. 2 is a block diagram of a section of the non-speculative exception handler of FIG. 1, constructed in accordance with the preferred embodiment.

Referring now to FIG. 2, the processor preferably has an associated thread processing unit (or TPU) that coordinates the operation of an associated thread. Each of the TPUs (not shown) periodically make requests to a TPU chooser unit 250 to have instructions fetched for execution by resources logic 280. In accordance with the preferred embodiment, fetched instructions for each of the threaded processing units are routed to the appropriate pipeline for further operations.

Referring still to FIG. 2, certain portions of the non-speculative handler 125 relevant to the present invention will now be described in accordance with the preferred embodiment of the present invention. The non-speculative handler 125 depicted in FIG. 2 is constructed to support a multi-threaded pipeline, with m threads. Thus, non-speculative handler 125 preferably includes m in-flight vector tables 245, 255, with one in-flight vector table associated with each TPU. The non-speculative exception handler also preferably includes an exception logger 220 and an exception register 225. The exception logger 220 receives excepted instructions from each of the pipeline threads (1, 2, ... n) and logs the exceptions by recording the instruction and the type of instruction. Each instruction that is brought into the machine (i.e., each instruction that is fetched) has at least one status bit in register 225 associated with it that is used to map the condition of that instruction. In the event that the instruction excepts, the status bit associated with that instruction is flagged or set. Thus, if Instruction E excepts, the status bit in register 225 associated with Instruction E is set. Two exception status bits 227, 231 are shown for instruction (0) and instruction (N). Each status bit in register 225 is compared with the contents of the in-flight vector tables. Two such in-flight vector tables 245, 255 are shown in FIG. 2 for purposes of illustration, with the understanding that such a vector table preferably is provided for each threaded processing unit. FIG. 2 contemplates that M vector tables will be provided for M threaded processing units. The in-flight vector table preferably comprises a map of each pending instruction that has been fetched. Thus, an in-flight vector table provides a status indication of instructions associated with a particular program. According to the preferred embodiment, each status bit in register 225 is compared with the contents of each in-flight vector table to determine which program is associated with an excepting instruction. Various implementations are possible to effectuate the comparison between the status bits of register 225 and each of the in-flight vector tables.

In one exemplary embodiment, register 225 and each of the in-flight vector tables are configured identically as a memory array with sufficient memory bits to represent each fetched instruction. Preferably, each of the bits in the register 225 and in-flight vector tables is consecutively numbered from 0 to N to commonly refer to the same instruction. The only bits set in the register 225 are those that have pending exceptions. If there is no exception, or if the exception is resolved, the status bit is cleared. The in-flight vector table preferably has an identical bit map, but the bits set in each of the in-flight vector table are those denoting that an instruction corresponds to that program thread. Thus, as each instruction is fetched, appropriate logic will check to determine which program that instruction belongs to, and will cause the bit corresponding to that instruction to be set in the appropriate in-flight vector table. According to the embodiment of FIG. 2, the in-flight vector tables and the status bit register are compared using logic gates, such as a plurality of AND gates. Thus, the status bit of register 225 is AND'ed together with the same corresponding bit in each of the vector tables to produce an output signal for that bit for each of the vector table.

If a match exists between a set status bit and the corresponding bit of an in-flight vector table, a disable signal is generated on a Disable signal line associated with that in-flight vector table. Thus, if a match occurs between non-speculative exception status bit (0) and bit (0) of in-flight vector table 255, AND gate 262 produces a high logic output that is transmitted on the Disable choice (M) output line. The Disable output lines all connect to the TPU chooser 250.

In response to the assertion of a disable signal, the TPU chooser 250 preferably disables the fetching for the program associated with that Disable line. Thus, if Disable choice line (M) is asserted, the TPU chooser will no longer fetch instructions for program (M) until the excepted instruction is resolved, thereby clearing the exception status bit, which in turn causes the output of the AND gate to reset the Disable line.

The above discussion is meant to be illustrative of the principles and various embodiments of the present invention. Numerous variations and modifications will become apparent to those skilled in the art once the above disclosure is fully appreciated. In particular, the preferred implementation of FIG. 2 is subject to many variations which will occur to one skilled in the art. Furthermore, the present invention, although shown for use with a non-speculative exception handler, could be used in a speculative exception handler or in a single exception handler that handles both speculative and non-speculative exceptions. It is intended that the following claims be interpreted to embrace all such variations and modifications.

What is claimed is:

1. A multi-threaded processor, comprising;
   a plurality of thread processing units capable of concurrently processing one or more instructions from different programs;
   a fetching unit that fetches instructions for each of said plurality of thread processing units;
   a non-speculative exception handler that receives an indication of any of a first group of excepting speculative instructions, and identifies the program associated with said excepted instruction, and wherein said exception handler generates a signal to said fetching unit to disable fetching for the program associated with the excepted instruction until the processor determines that the excepted instruction is associated with an actual program path, and permitting the fetching unit to continue fetching instructions for at least one other thread processing unit so that processor resources can continue to be used to execute instructions such at least one other program running on another thread processing unit; and
   a speculative exception handler that receives an indication of any of a second group of excepting speculative instructions and, without the processor determining whether a second group instruction is from the actual program path, the speculative exception handler resolves said second group excepted instruction.

2. The processor of claim 1, wherein the non-speculative exception handler includes a wi a plurality of status bits, and wherein each status bit corresponds to a particular instruction fetched by said fetching unit.

3. The processor of claim 2, wherein the non-speculative exception handler also includes an in-flight vector table for each of said plurality of thread processing units, and wherein each in-flight vector table comprises a map that includes a bit corresponding to each instruction fetched said fetching unit, and wherein the bits in said map are set that correspond to program instructions executed by the associated thread processing unit.

4. The processor of claim 3, further comprising a comparator associated with each in-flight vector table that compares each of said status bits with the corresponding map bit in the in-flight vector table.

5. The processor of claim 4, wherein each of the thread processing units is capable of processing a different program.

6. The multi-threaded processor of claim 1 wherein the first group of excepting speculative instructions comprise instructions selected from a group consisting of instructions that cannot be decoded, instructions that result in a divide by zero condition, arithmetic overflows, and cache parity errors.

7. The multi-threaded processor of claim 6 wherein the second group of excepting speculative instructions comprises exceptions selected from the group consisting of branch mispredictions, jump mispredictions, and load/store order traps.

8. The multi-threaded processor of claim 1 wherein the second group of excepting speculative instructions comprises exceptions selected from the group consisting of branch mispredictions, jump mispredictions, and load/store order traps.

9. A method of handling exceptions in a processor during the execution of a plurality of programs, comprising:
    detecting an exception for a speculative instruction in one or more stages of one or more pipelines;
    determining whether to defer resolution, of said exception based on an exception type for said excepted speculative instruction;
    after determining whether to defer resolution of said exception, determining whether said excepted speculative instruction needs to be executed;
    discontinuing fetching of instructions associated with a speculative instruction whose exception is of a type that is determined not to be critical to processor performance permitting other thread processing units in said processor to use processor resources to execute instructions; and
    routing at least some of said detected exceptions to a first exception handler and some of said detected exceptions to a second exception handler.

10. The method of claim 9, further comprising not deferring resolution of said exception if said exception type is critical to processor performance.

11. The method of claim 10, further comprising continuing fetching instructions upon resolution of said exception.

12. The method of claim 11, wherein said first exception handler identifies the program that is the source of the excepted instruction.

13. A processor capable of executing multiple programs, comprising:
    a plurality of thread processing; units capable of executing one or more instructions from different programs;
    a fetching unit that fetches instructions for said thread processing units;
    logic that includes a non-speculative exception handler and a speculative exception handler, the logic detects exceptions to speculative instructions and defers processing of some of said exceptions, but not other of said exceptions; and
    fetch logic that fetches instructions for said thread processing units and that is disabled from fetching instructions for one of said thread procession units upon detection of an exception, the processing of which is to be deferred, wherin the fetch is disabled from fetching instructions for said one of said thread processing units until said deterred exception is eventually processed, but continues to execute instructions in said other thread processing units.

14. The processor of claim 13 wherein, whether the logic defers processing of some of said exceptions, but not other of said exceptions, depends on exception type.

15. The processor of claim 14 wherein a first exception type that causes the logic to defer processing comprises branch mispredictions, jump mispredictions, and load/store order traps.

16. The processor of claim 15 wherein a second exception type that causes the logic to defer processing comprises instructions selected from a group consisting of instructions that cannot be decoded, instructions that result in a divide by zero condition, arithmetic overflows, and cache parity errors.

17. The processor of claim 14 wherein an exception type that causes the logic not to defer processing comprises instructions selected from a group consisting of instructions that cannot be decoded, instructions that result in a divide by zero condition, arithmetic overflows, and cache parity errors.

18. An exception handler that resolves excepted speculative instructions within a processor comprising:
    a first exception handler unit that begins to resolve a first type of exception without determining whether the instructions associated with said first type of exceptions need to be executed; and
    a second exception handler unit that defers resolution of a second type of exception until it is determined that the instructions associated with said second type of exception need to be executed and disables a fetch logic from fetching additional instructions for a thread processing unit containing an excepted instruction of the second type but permitting said fetch logic to continue fetching instructions for another thread processing unit.

19. The exception handler of claim 18 wherein the first type of exception comprises exceptions selected from the group consisting of branch mispredictions, jump mispredictions, and load/store order traps.

20. The exception handler of claim 18 wherein the second type of exception comprises exceptions selected from the group consisting of instructions that cannot be decoded, instructions that result in a divide by zero condition, arithmetic overflows, and cache parity errors.

21. The exception handler of claim 18 wherein the first type of exception comprises critical exceptions and the second type of exception comprises non-critical exceptions.

* * * * *

UNITED STATES PATENT AND TRADEMARK OFFICE
CERTIFICATE OF CORRECTION

| | |
|---|---|
| PATENT NO. | : 7,240,186 B2 |
| APPLICATION NO. | : 09/906345 |
| DATED | : July 3, 2007 |
| INVENTOR(S) | : Shane L. Bell et al. |

It is certified that error appears in the above-identified patent and that said Letters Patent is hereby corrected as shown below:

In column 1, line 29, delete "modem" and insert -- modern --, therefor.

In column 1, line 65, delete "modem" and insert -- modern --, therefor.

In column 2, line 7, delete "modem" and insert -- modern --, therefor.

In column 10, line 26, in Claim 1, delete ";" and insert -- : --, therefor.

In column 10, line 53, in Claim 2, delete "wi" and insert -- register with --, therefor.

In column 10, line 60, in Claim 3, after "fetched" insert -- by --.

In column 11, line 24, in Claim 9, after "resolution" delete ",".

In column 11, line 49, in Claim 13, after "processing" delete ";".

In column 12, line 3, in Claim 13, delete "procession" and insert -- processing --, therefor.

In column 12, line 5, in Claim 13, delete "wherin" and insert -- wherein --, therefor.

In column 12, line 5, in Claim 13, after "fetch" insert -- logic --.

In column 12, line 7, in Claim 13, delete "deterred" and insert -- deferred --, therefor.

UNITED STATES PATENT AND TRADEMARK OFFICE
CERTIFICATE OF CORRECTION

PATENT NO. : 7,240,186 B2 Page 2 of 2
APPLICATION NO. : 09/906345
DATED : July 3, 2007
INVENTOR(S) : Shane L. Bell et al.

It is certified that error appears in the above-identified patent and that said Letters Patent is hereby corrected as shown below:

In column 12, line 18, in Claim 16, after "logic" insert -- not --.

In column 12, line 30, in Claim 18, after "processor" insert -- , --.

Signed and Sealed this

Nineteenth Day of August, 2008

JON W. DUDAS
*Director of the United States Patent and Trademark Office*